United States Patent [19]
Parker

[11] Patent Number: 5,505,018
[45] Date of Patent: Apr. 9, 1996

[54] DECORATIVE BEER DISPENSER FOR KILLING SLUGS

[76] Inventor: G. R. Parker, 445 E. 4500 South, Ste. 174, Salt Lake City, Utah 84107

[21] Appl. No.: 179,087

[22] Filed: Jan. 10, 1994

[51] Int. Cl.⁶ .......................... A01M 25/00; A01M 1/20
[52] U.S. Cl. .................................. 43/124; 43/131
[58] Field of Search ............. 43/124, 126, 107, 43/121, 132.1, 131, 900, 1; 222/420, 78; 4/222, 223, 251.1, 226.1, 368, 419

[56]                References Cited

U.S. PATENT DOCUMENTS

| | | | |
|---|---|---|---|
| 2,356,022 | 8/1944 | Wright | 43/121 |
| 2,781,607 | 2/1957 | Smiley | 43/131 |
| 3,122,857 | 3/1964 | Yates | 43/131 |
| 5,263,274 | 11/1993 | Speed | 43/1 |
| 5,299,376 | 4/1994 | Roberts | 43/1 |
| 5,301,836 | 4/1994 | Luu | 222/78 |
| 5,325,626 | 7/1994 | Jackson | 43/132.1 |

*Primary Examiner*—Maurina T. Rachuba
*Assistant Examiner*—Chuck Y. Mah
*Attorney, Agent, or Firm*—Marcus G. Theodore

[57]                ABSTRACT

A decorative beer dispenser with a weighted base and storage vessel constructed of a single piece of blow molded beer impervious material in a decorative shape defining a base compartment, and a reservoir compartment; said base having a top defining a shallow drip reservoir filled with beer to attract snails, slugs, and the like to ingest beer and be killed; and said reservoir compartment structured to store and continuously deliver beer into the drip reservoir.

7 Claims, 2 Drawing Sheets

DECORATIVE BEER DISPENSER FOR KILLING SLUGS

BACKGROUND OF THE INVENTION

1. Field

This invention pertains to inventions for killing slugs, snails, and the like. More particularly, it relates to decorative dispensers adapted to hold and continuously dispense beer solutions for killing slugs, snails, and the like.

2. State of the Art

It has long been known that slugs, snails, and the like can be killed by attracting them to ingest beer solutions. Traditionally, beer has been placed in shallow plates or vessels around an infested area. The malt in the beer then attracts the slugs and snails which ingest the beer solution and are killed by the alcohol contained in the beer. The beer solutions in these shallow plates or vessels quickly become diluted and rendered ineffective, if lawn sprinklers, or showers are encountered. Nor do these shallow plates and vessels compliment a yard's decor when placed around a yard or infested area.

There thus remains a need for an attractive outdoor beer dispenser, which insures that a highly concentrated beer solution is maintained regardless of rain or yard sprinkling to insure the beer's effectiveness in killing slugs, snails, and the like. The invention described below provides such a beer dispenser.

SUMMARY OF THE INVENTION

The present invention comprises a beer dispenser having a weighted base to keep the beer dispenser from tipping over. The top of the base defines a shallow depression which acts as a shallow drip reservoir to hold beer to attract slugs, snails, and the like. Mounted above the drip reservoir is a storage vessel having an open top with a removable stopper into which beer is placed for storage and delivery. The bottom of the storage reservoir has a controlled drip dispenser to continuously drip beer into the drip reservoir. For use with regular beer, preferably the drip dispenser consists of a fixed orifice drip release which selectively releases approximately 2 cc. of beer per hour. The exact flow rate is set to insure that sufficient beer is dispensed to prevent the drip reservoir from drying out, and at the same time insuring that sufficient beer is delivered to purge the drip reservoir and prevent dilution of the beer in the event showers or sprinkling is encountered.

Preferably, the size of the storage vessel is selected to store a three to five day supply of beer. The top of the storage vessel generally has a pressure relief hole within it to maintain ambient atmospheric pressure within and without the storage vessel to allow flat beer to continue to flow through the drip release at the preselected flow rate. Where pressurized beer containing carbon dioxide gas is used, these pressure release holes allow excess gases to escape; thereby preventing excessive pressure release of beer into the drip reservoir.

Regular beers generally are self cleaning inasmuch as the beer acts as a surfactant which prevents obstruction of the drip orifice. However, malt beers are more dense and contain sugars which tend to gum up and plug a fixed diameter drip orifice. For use with these heavier malt beers, the drip dispenser preferably consists of a cleanable control valve, such as a stopcock, which can be removed and periodically cleaned to prevent malt build up from interfering with the rate of flow of beer into the drip reservoir.

Preferably, the beer dispenser is constructed of a single blow molded piece in the shape of an attractive animal or yard creature. It is constructed of beer impervious material, such as polystyrene, and polyvinyl acetate. The molded base of the beer dispenser may be solid, or structured as a hollow base compartment into which sand, water, dirt, or the like may be placed to add weight to the base of the beer dispenser to prevent it from tipping. Mounted above the base is an upper molded reservoir within the beer dispenser which is sized and structured to hold the desired supply of beer. This reservoir stored beer is then continuously drip released through a controlled drip port in communication with the reservoir and mounted above the base to continuously feed a supply of beer into the drip reservoir.

The shape, color, and pattern of the beer dispenser can be varied to suit the preference of a user. In one preferred embodiment, the beer dispenser is constructed of a plastic resembling terra-cotta to provide an attractive lawn ornament complimentary to planting pots used in gardens. In another embodiment, the beer dispenser is colored and patterned to resemble naturally occurring animals or plants. Some designs which are particularly attractive are frogs, ducks, rabbits, squirrels, and the like.

Where it is desired to store a much larger supply of beer, the beer dispenser may be shaped into a bird bath having an open topped pedestal is attached to the base which serves as a large beer reservoir. A bird bath basin is then placed on top of the open top of the pedestal and acts as a stopper. Beer is then continuously dripped into a drip reservoir on the top of the base to attract and kill slugs and snails via a control valve associated with a spout which delivers beer from the storage reservoir into the drip reservoir.

The beer dispenser is used by first removing the stopper of the storage reservoir, and filling the same with a three to five day supply of beer. The stopper is then replaced, and the beer dispenser positioned in a desired location within a slug or snail infested area. The beer dispenser then drips a continuous supply of fresh beer solution into the shallow drip reservoir. The beer in the drip reservoir attracts slugs and snails which crawl up the base, ingest the beer solution, and crawl off to die. If it rains, or lawn sprinklers dilute or wash out the beer solution, the continuous controlled beer drip release promptly fills and replaces the drip reservoir with a sufficiently concentrated beer solution to kill slugs and snails.

Although this invention is primarily designed for use with beer solutions, other environmentally safe insecticides may be used. However, beer provides an environmentally safe solution which does not kill other desirable pets or animals which happen to ingest the solution. Beer also provides plant nutrients to the soil, so that if too much beer is dispensed or accidentally spilled, there are no harmful effects to plants or surrounding lawn.

To provide more animation to the beer dispenser, the beer reservoir may be rotatably attached to the base of the beer dispenser to turn in the wind. This wind driven embodiment has a circumferential shallow drip reservoir running along the entire top of the reservoir so that the rotating reservoir drips into the drip reservoir from any direction. This rotating beer dispenser embodiment thus provides a more life like animal form to enhance garden decor.

The above invention thus provides an environmentally safe, effective outdoor slug and snail killing beer dispenser, which can also be used as an ornamental yard decoration.

DESCRIPTION OF THE ILLUSTRATED EMBODIMENTS

Figure 1:
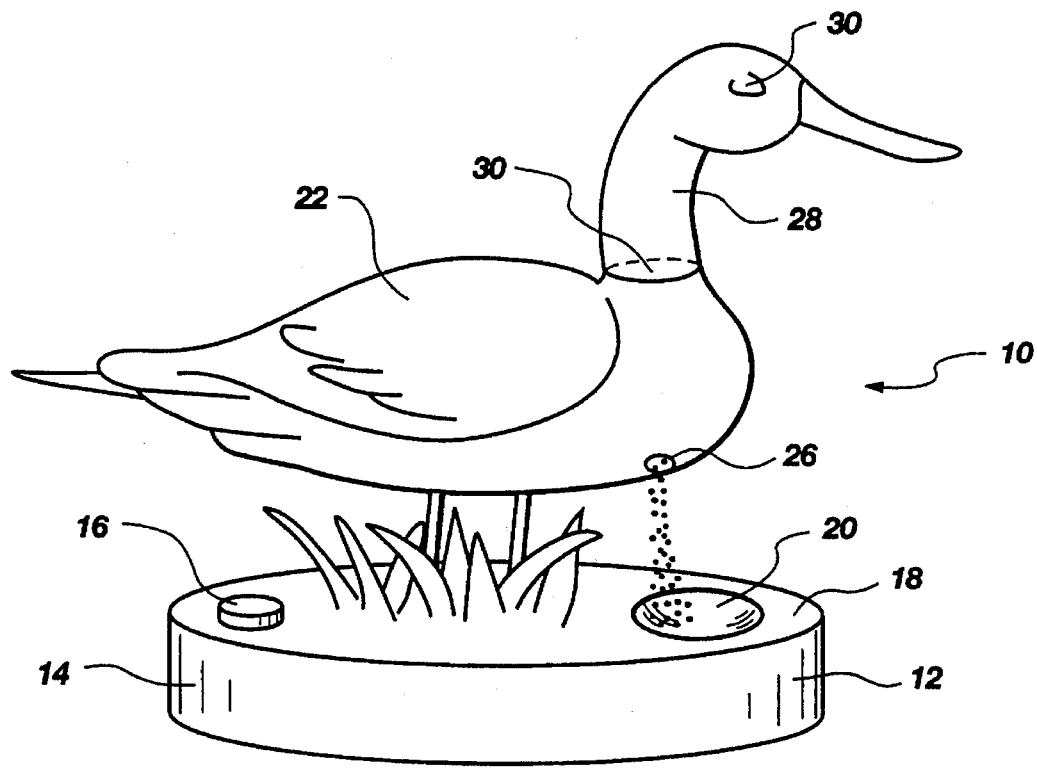
FIG. 1 illustrates a perspective view of one preferred embodiment of the invention.

FIG. 1 illustrates a preferred embodiment of the invention 10 constructed of a single blow molded piece in the shape of an duck. It is constructed constructed of a beer impervious material such as polystyrene, and polyvinyl. The molded base 12 of the beer dispenser 10 has a hollow base compartment 14 structured to hold sand, water, dirt, or the like poured through a screw plug 16 in the top 18 of the base 12. It is structured to provide weight to the beer dispenser base 12 to prevent the beer dispenser 10 from tipping. The top 18 of the base 12 has a shallow drip reservoir 20 into which beer is poured.

The upper segment 22 of the beer dispenser 10 is hollow and structured to define a reservoir 24 to hold a three to five day supply of beer for release through a controlled drip port 26 mounted above the base 12. The drip port 26 is in communication with the reservoir 24 and continuously feed a supply of beer into the drip reservoir 20 on the top 18 of the base 12. The head 28 of the duck is structured as a removable stopper which plugs a fill hole 30 in communication with the reservoir 24. To fill the reservoir 24, the head 28 is removed, and beer is poured through the fill hole 30. The head is then replaced. Preferably, the head 28 defines a pressure release hole 32 in communication with the reservoir 24 to equalize the pressure within and without the reservoir 24 by allowing contact with the ambient air. This allows the beer to drain from the reservoir 24 without pressure differential interference.

The beer dispenser 10 shown is constructed of a beer impervous material resembling terra-cotta to provide an attractive lawn ornament complimentary to planting pots typically used in gardens.

Figure 2:
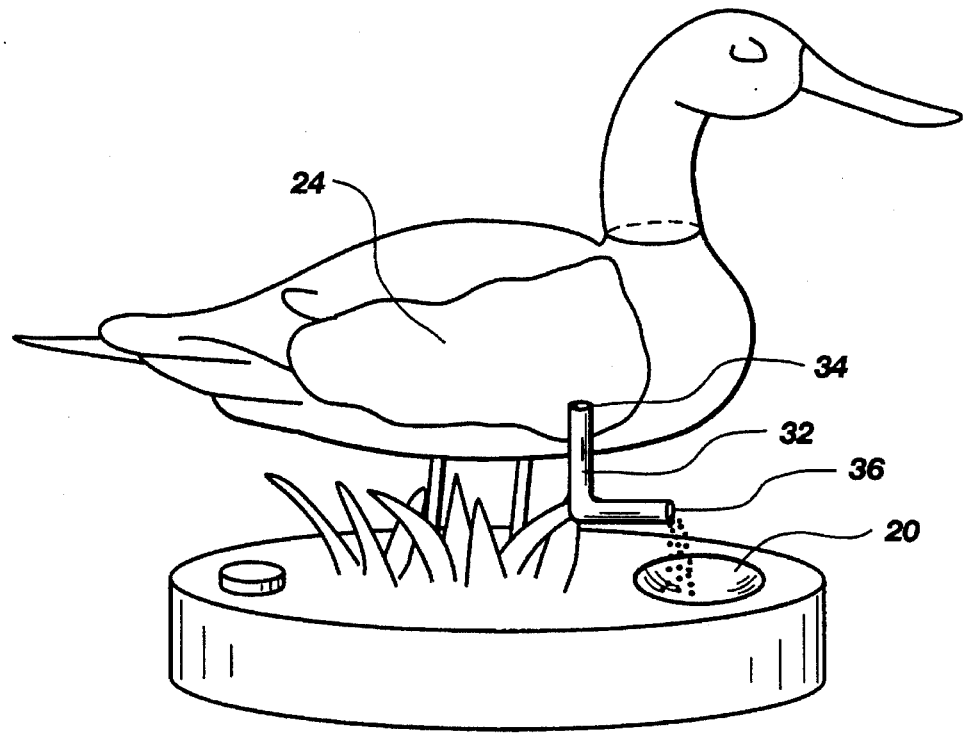
FIG. 2 illustrates a cross-section view of a preferred embodiment of the invention.

FIG. 2 is a cross section of the beer dispenser 10 shown in FIG. 1 with another type of means to drip beer into the drip reservoir 20. In this embodiment, an L-shaped pipet 33 is inserted through the bottom of the upper segment 22 of the beer dispenser 10. The pipet 32 has a top end 34 in communication with the beer reservoir 22, and a bottom end 36 positioned above the drip reservoir 20 to continuous drip fill the drip reservoir 20.

Figure 3:
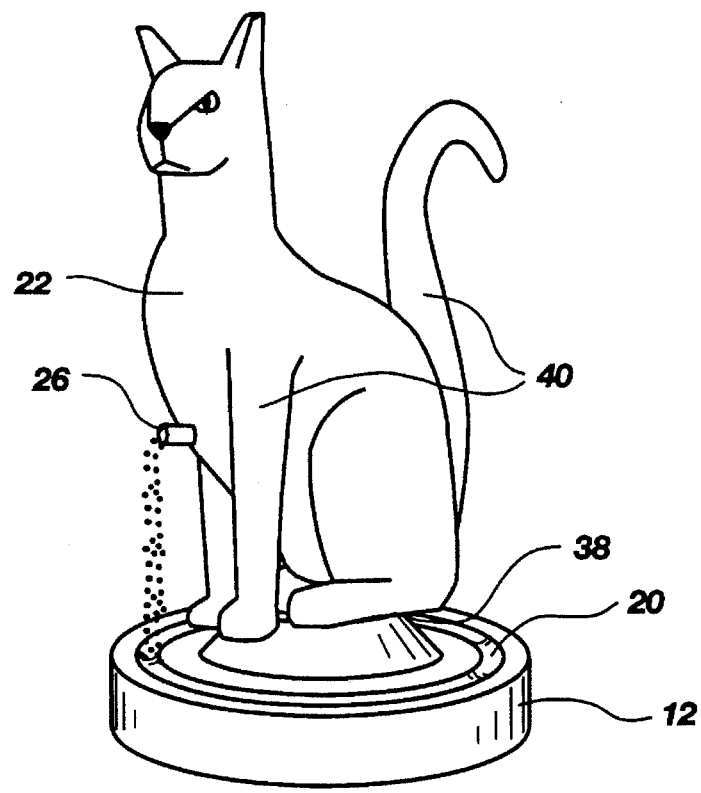
FIG. 3. illustrates another preferred embodiment of the invention.

FIG. 3 illustrates a perspective view of another preferred embodiment of the invention 10 shaped as a cat. This embodiment has the beer reservoir 24 constructed within the body of the cat. The base of the upper segment 22 is swivel mounted via a pivot mount 38 attached to the top of the base 12, thus allowing the beer dispenser 10 to turn in the wind. Appendages 40 are included to catch the wind to more readily pivot the beer dispenser 10. This movement makes the beer dispenser 10 more lifelike and animated. The turning embodiment has a solid base 12 with a shallow circumferential groove along the top 18 forming a shallow drip reservoir 20. As the beer dispenser 10 pivots on the base, beer is dripped from any direction via the drip port 26 into the circumferential drip reservoir 20 to attract slugs, snails, and the like.

Figure 4:
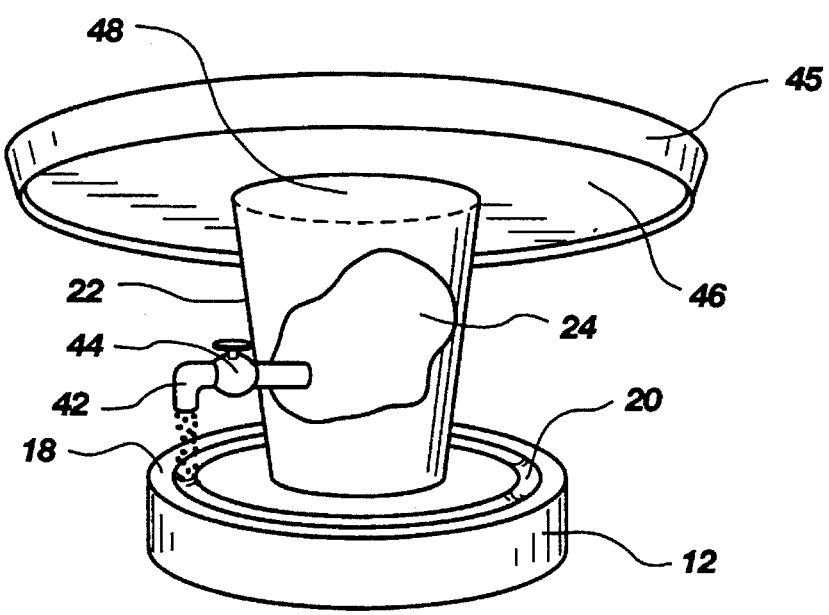
FIG. 4. illustrated another preferred embodiment of the invention.

FIG. 4. illustrates another preferred embodiment of the invention 10 shaped as a bird bath. This embodiment is designed to hold a larger supply of beer within an open topped reservoir 24 defined by the pedestal upper segment 22 of the bird bath. The pedestal reservoir 24 is mounted on a base 12 with a shallow circumferential groove along the top 18 forming a shallow drip reservoir 20. A drip spout 42 is attached to the side of the pedestal in communication with the pedestal reservoir 24. It is placed in a position such that the drip spout 42 drip deposits beer into the drip reservoir 20. A stopcock valve 44 is associated with the drip spout 42 such that the valve can be cleaned when heavy malts are used. A bird bath basin 45 with a bottom 46 sized to cover the open top 48 of the pedestal reservoir 22 is mounted on top of the pedestal 24. Thus placed, the bird bath basin 45 removably seals the open top 48 of the pedestal reservoir 24. This particular embodiment is preferably located in a severely slug or snail infested area requiring long term continual beer delivery treatment. It is also preferred for use with heavy malt beers, which tend to plug drip orifices.

Although this specification has referred to the illustrated embodiments, it is not intended to restrict the scope of the appended claims. The claims themselves recite those features deemed essential to the invention.

I claim:

1. A decorative beer and environmentally safe insecticide dispenser having
   a. a weighted base with a top defining a depression forming a shallow drip reservoir sized to hold beer or environmentally safe insecticides, and structured to allow insects, slugs, and snails to climb onto and drink from the drip reservoir,
   b. a storage vessel mounted above the drip reservoir having an impervious bottom, and sides defining a storage reservoir with fill hole means into which beer and environmentally safe insecticides are poured for storage at ambient pressures,
   c. a removable stopper with pressure relief means for covering the fill hole means of the storage reservoir,
   d. means associated with the bottom of the storage vessel and in communication with the storage reservoir to continuously drip beer or environmentally safe insecticides stored in the storage reservoir into the drip reservoir.

2. A decorative beer and environmentally safe insecticide dispenser according to claim 1, wherein the means to continuously drip beer or environmentally safe insecticide, comprises a fixed cross-sectional orifice in the bottom of the storage reservoir positioned above the drip reservoir to selectively release beer or environmentally safe insecticide into the drip reservoir at a predetermined flow rates.

3. A decorative beer and environmentally safe insecticide dispenser according to claim 1, wherein the means to continuously drip beer or environmentally safe insecticide comprises a flow valve in communication with the storage reservoir positioned above the drip reservoir to selectively release beer or enviromentally safe insecticide into the drip reservoir at a predetermined flow rates.

4. A decorative beer and envirnmentally safe insecticide dispenser according to claim 1, wherein the weighted base and storage reservoir are shaped, colored, and patterned.

5. A decorative beer and environmentally safe insecticide dispenser according to claim 1, wherein the storage reservoir is pivotally mounted to the weighted base to rotate, and the drip reservoir is circumferentially structured to receive beer or environmentally safe insecticide from the storage reservoir when the storage reservoir is turned in any direction.

6. A decorative beer and environmentally safe insecticide dispenser according to claim 1, wherein the weighted base and storage reservoir are constructed of a single piece of blow molded beer and environmentally safe insecticide impervious material in a decorative shape of an animal defining a base compartment, and a reservoir compartment; said base compartment structured to be filled with a weight material such as sand, dirt, and water, and having a top defining a shallow drip reservoir; and said storage reservoir compartment having a removable top in the shape of the head of an animal to allow beer or environmentally safe insecticides to be poured into the storage reservoir, and the bottom of the storage vessel defining a drip orifice in communication with the storage reservoir positioned above the drip reservoir to selectively release beer or environmentally safe insecticide into the drip reservoir at a predetermined flow rate.

7. A decorative beer and environmentally safe insecticide dispenser according to claim 6, wherein the removable top has a pressure relief hole in communication with the storage reservoir to maintain ambient pressure within said storage reservoir.

\* \* \* \* \*